United States Patent [19]

Jankowiak et al.

[11] 3,867,250

[45] Feb. 18, 1975

[54] STRAW MATS FOR SOIL EROSION CONTROL
[75] Inventors: Erwin M. Jankowiak, Sanford; Gerald H. Brandt, Midland, both of Mich.
[73] Assignee: The Dow Chemical Company, Midland, Mich.
[22] Filed: Nov. 19, 1973
[21] Appl. No.: 417,310

[52] U.S. Cl............... 161/271, 161/157, 161/249, 47/9, 61/38, 260/17.4 BB, 260/78.5 BB
[51] Int. Cl. ............................................. C08f 45/18
[58] Field of Search 260/17.4 BB, 17.4 R, 17.4 CR, 260/78.5 BB, 80.7; 117/161 UD, 161 UT, 143 A; 161/150, 247, 271, 249; 61/38; 47/9

[56] References Cited
UNITED STATES PATENTS

| | | | |
|---|---|---|---|
| 2,769,711 | 11/1956 | Wilson | 260/17.4 BB |
| 2,961,799 | 11/1960 | Coe | 260/17.4 BB |
| 3,026,217 | 3/1962 | Hechtman et al | 117/161 UD |
| 3,513,121 | 5/1970 | Heaton | 260/894 |

Primary Examiner—William J. Van Balen
Assistant Examiner—R. J. Roche
Attorney, Agent, or Firm—Albin R. Lindstrom

[57] ABSTRACT

Straw mats useful for covering soil to prevent wind and rain erosion are made by randomly distributing straw into a layer and binding the stalks together at their points of contact with at least about 75 pounds per ton of straw of a water resistant adhesive comprising a polymer of an alkenyl aromatic monomer, an open chain conjugated diene and an unsaturated carboxylic monomer blended with a water soluble cellulose ether and with an organo sulfonate.

8 Claims, No Drawings

STRAW MATS FOR SOIL EROSION CONTROL

BACKGROUND OF THE INVENTION

Soil erosion is a phenomenon occurring in a wide variety of situations. It is accelerated by the action of wind and of rain and is especially bad in conditions of poor soil coherence. The loose surface is scuffed by the wind and seeds of plants that might otherwise germinate to provide a root system to hold the soil in place are disturbed. In like fashion streams of water formed in rain storms on less pervious soils carry away the surface.

In the making of cuttings, embankments, or culverts during highway construction, large areas of steeply sloping bare soil are exposed to the weather. The construction engineer has commonly distributed a layer of straw over the surface. However, that is susceptible to loss by wind. More recently asphalt emulsions have been applied to the straw layer to hold the stalks in place. Those emulsions are undesirable because of application difficulties such as a need for heat source, plugging of the application equipment and creating a major clean-up problem.

The straw serves another function as an insulator to protect newly emerging grasses from frost when the seeding is done in the spring or late fall. Also, straw is available in the near vicinity of where needed.

THE PRIOR ART

Randomly distributed straw has been used for a long time as a mulch. Likewise, asphalt emulsions have been used to adhere straw stalks into mats.

Soil erosion control using solutions or dispersions of polymeric materials is the subject of numerous patents. Such techniques require the use of relatively large amounts of polymer all of which usually must be transported long distances to the application site.

SUMMARY OF THE INVENTION

The present invention is directed to straw mats useful for soil erosion control especially for steeply sloping bare soil. The mats are layers of randomly distributed straw stalks bound together into a mat structure with a water resistant adhesive as will be described.

By straw is meant the semi-rigid filamentary stalk of grain, flax or like plant. For purposes of this invention, it is immaterial whether the stalks are used with or without the grain or seed. Also, the straw may be used as is or may be chopped into given lengths.

The water resistant adhesive consists essentially of an aqueous polymer latex, a water soluble cellulose ether and an organo sulfonate.

The useful latexes are those of interpolymers of an alkenyl aromatic monomer, an open chain aliphatic conjugated diene and an unsaturated carboxylic monomer.

By the term, alkenyl mononuclear aromatic monomer, it is intended to include those monomers wherein an alkenyl group is attached directly to an aromatic nucleus containing from 6 to 10 carbon atoms. Those monomers are intended to include alkyl- or halo-substituted compounds. Typical of these monomers are styrene, orthometa-, and para-methylstyrene, ortho-, meta-, and para-ethylstyrene, ortho, para-dimethylstyrene, ortho, para-diethylstyrene, para-chlorostyrene, isopropylstyrene, ortho-methyl-para-isopropylstyrene, ortho-, para-dichlorostyrene, vinyl-naphthalene, and diverse vinyl(alkylnaphthalenes and vinyl(halonaphthalenes). The term is also intended to include comonomeric mixtures of styrene with $\alpha$-methylstyrene or one of the above-named alkenyl mononuclear aromatic monomers. Because of their availability and their ability to produce desirable polymers and for other reasons, it is preferred to use styrene or vinyl toluene as the monovinyl aromatic monomer.

By the term, open-chain aliphatic conjugated diene having from 4 to about 9 carbon atoms, it is meant to include, typically, butadiene-1,3; 2-methyl-butadiene-1,3; 2,3-dimethylbutadiene-1,3; piperylene; 2-neopentylbutadiene-1,3; and other hydrocarbon homologs of butadiene-1,3, and, in addition, the substituted dienes, such as 2-chlorobutadiene-1,3, 2-cyanobutadiene-1,3; the substituted straight chain conjugated pentadiene, the straight and branch chain hexadiene, and others having from 4 to about 9 carbon atoms. The butadiene-1,3 hydrocarbons, because of their ability to produce particularly desirable polymeric materials, are especially advantageous. Butadiene-1,3 which is inexpensive, readily available, and produces interpolymers having excellent properties is preferred.

The monoethylenically unsaturated acid derivative may be selected from a wide variety of compounds, such as carboxylic acids, and anhydrides. It is imperative that the acid derivative be copolymerizable with the other monomers and that it be an acid or hydrolyzable to an acid. Typical examples of these derivatives are itaconic acid, acrylic acid, vinyl sulfonic acid, vinyl benzoic acid, and isopropentyl benzoic acid. Mixtures of two or more such monoethylenically unsaturated acid derivatives may be used if desired.

The diolefin should constitute from at least 40 percent by weight of the total weight of monomers used. The alkenyl aromatic monomer should constitute less than 60 percent by weight of the total weight of monomers and the monoethylenically unsaturated acid derivative should be present in amounts of from 2 to 10 percent by weight of the total weight of monomers. Polymers having compositions outside of the above stated limits generally have one or more undesirable properties which make them unsuitable for use in the instant invention.

The latexes may be prepared by known procedures for polymerization in aqueous emulsion. Typically, the monomers are dispersed in an aqueous solution of from about 0.05 to 5 percent of a polymerization catalyst, such as potassium persulfate and from about 0.05 to 5 percent of a pH stable surface-active agent capable of emulsifying the monomers. Many such surface-active agents are known. Polymerization is initiated by heating the emulsified mixture usually between 30° to 70° C. and is continued by maintaining the polymerizing emulsion at the selected temperature. After the polymerization has reached the desired conversion of monomer to polymer, the latex is filtered to remove any precoagulum and may be stabilized to storage by the addition of a small amount of known stabilizer.

Most latexes as sold commercially have from about 30 to 50 weight percent polymeric solids. The latexes may be used at that solids concentration, but are difficult to spread over a straw mulch. It is advantageous to dilute the latexes to from about 5 to 10 percent solids so they can be pumped and spread easily.

The water resistant adhesive also includes a water soluble cellulose ether. Representative of the useful cellulose ethers are methyl cellulose and the hydroxyalkyl methyl celluloses where the hydroxyalkyl group contains from 2 to 4 carbon atoms. A preferred class of such ethers includes those hydroxypropyl methyl cellulose ethers having from 0.4 to 1.3 methoxyl substitution and from 0.2 to 1.4 hydroxypropoxy substitution with a total substitution of at least 1.0. Such cellulose ethers are commercially available in various viscosity grades. A cellulose ether with a viscosity in 2 percent aqueous solution of from about 50 to about 100 Krebs units measured at 20°C is especially suitable for use herein although higher or lower viscosities may also provide advantages to the adhesive.

The organo sulfonates are water soluble compounds having at least one sulfonate group attached to an aromatic ring and may be represented by the formula:

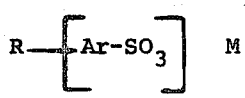

wherein R is alkyl having from about 8 to 20 carbon atoms, an alkenyl chain having from about 8 to 20 carbon atoms and combinations of said chains with ethoxy chains, phenyl, phenoxy, and alkyl or alkoxy substituted phenyl or phenoxy; Ar is phenyl or naphthyl and M is an alkali metal or ammonia.

An advantageous class of organo sulfonates is represented by the formula:

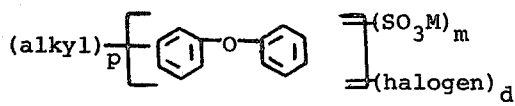

wherein "alkyl" represents an alkyl radical having from 8 to 18 carbon atoms, $p$ is an integer from 1 to 2; halogen represents chlorine or bromine, $d$ represents an integer from 0 to 1, M represents an alkali or alkaline earth metal, and $m$ represents an integer from 1 to 3. Thus, there is included the alkali metal alkylated phenyl ether sulfonates having from 8 to 18 carbon atoms in the alkyl chain, the alkali metal dialkylated phenyl ether sulfonates, the alkali metal alkylated phenyl ether, disulfonates, the alkali metal dialkylated phenyl ether disulfonates, and their chloro and bromo derivatives, and the like, and the alkaline earth alkylated phenyl ether sulfonates, the alkaline earth dialkylated phenyl ether sulfonates, the alkaline earth alkylated phenyl ether disulfonates, and the like.

A preferred organo sulfonate is dodecyl phenyl ether sulfonate sodium salt.

The proportions of the components may be varied within rather wide limits while retaining the adhesivity as well as the water resistance. The cellulose ether should be present in an amount of at least about 0.5 weight percent based on the weight of the polymer. Preferably the cellulose ether should be from about 1.0 to about 2.5 weight percent. The organo sulfonate should be present in sufficient amount to attain a water resistant film but not so much as to destroy the water resistance. Generally that amount will be in the range of about 0.7 to about 2.5 weight percent based on the weight of the polymer.

The mat is prepared by laying down a mat of randomly distributed straw followed by spraying with the adhesive. Alternatively, the straw and adhesive may be mixed and distributed into the mat. In either instance, the stalks are adhered together at their points of contact with each other.

The amount of straw to be used may be varied within wide limits depending upon the severity of the expected exposure, the equipment available and other known factors. Generally, about 2 tons per acre will suffice to prevent wind and rain erosion.

The amount of polymer solids will vary depending on a number of factors, including for example, the anticipated severity of the exposure of the mat, the kind of straw used, and the particular adhesive employed. As a rule the straw mat will require the use of a minimum of about 75 pounds of latex solids per 1 ton of straw. Preferably, at least about 85 pounds per ton of straw will be used in making mats for the highway construction purposes. In the usual situation that will amount to about 170 to 175 pounds spread over 2 tons straw mulch per acre.

The mats of this invention are highly effective in preventing wind and rain erosion of loose soil. Also, the method of their preparation presents many advantages ecologically over the prior used asphaltic emulsions. In addition, no heat source is needed, equipment plugging is minimized and cleanup is expeditious. A further advantage is that useful mats can be prepared with one-third or one-fourth of the present binder over that required with asphaltic emulsions.

EXAMPLE 1

Straw was chopped into 2-inch and 4-inch lengths. 54.7 grams were spread evenly into a mat 9 by 21 inches. This was equivalent to about 2 tons of straw per acre. A latex having 5 percent solids was sprayed onto the surface of the straw mat at a rate equivalent to 175 pounds solids per acre using a spray bottle. The mats were dried overnight under ambient conditions.

Wind durability tests were conducted on the straw mats. The mat was positioned on a grade of 1.5:4 and air directed through a 9 by 5 inch opening onto the upper half of the mat. The air velocity was varied up to a maximum of 48 miles per hour.

The latex used was of an interpolymer of 36.5 weight percent styrene, 60 weight percent butadiene, 2 weight percent acrylic acid and 1.5 weight percent maleic anhydride (Latex A). The latex was formulated to have a total amount of 1.35 weight percent based on latex solids of a mixture of sodium dodecyl phenoxy benzene sulfonates consisting of about 75 percent monoalkylated and 25 percent dialkylated products. Varying amounts of a hydroxypropyl methyl cellulose having a viscosity of 75 Krebs units and prepared according to U.S. Pat. No. 3,388,082 were added to the latex.

The results are shown in the following table.

TABLE I

| % cellulose ether based on latex solids | % mat weight loss | conditions (mph) |
| --- | --- | --- |
| 0 | 55.0 | at 44 |
| 0.5 | 5.5 | 10 mins. at 48 |
| 1.0 | 2.5 | 10 mins. at 48 |
| 2.5 | 1.0 | 3-4 mins. at 48 |

EXAMPLE 2

Various latexes were formulated and were used in preparing straw mats as in Example 1. After drying, the mats were tested for rain durability. The mats were positioned under a water resevoir fitted with 225 number 22 hypodermic syringe needles each of which delivered drops of about 0.11 inch diameter. The needles were positioned on ¾-inch centers in an area of 12 by 12 inches.

The mats were placed in a sloping position of 39° and 45° with the simulated rain falling upon one-half to two-thirds of the mat. The rain was allowed to fall for 15 minutes at a rate of about 10 inches/hour. The mats were then redried and their physical condition observed.

The latex was applied at a rate equivalent to 175 pounds of latex solids per acre. Varying amounts of the cellulose ether of Example 1 were used.

The latexes used were latex A as defined in Example 1. Latex B was of a terpolymer of 42 weight percent styrene, 55 weight percent butadiene, and 3 weight percent itaconic acid with 1 percent of sodium lauryl sulfate in place of the sulfonate. Latex C was of a terpolymer of 47.1 weight percent styrene, 50 weight percent butadiene and 2.9 weight percent itaconic acid and used 0.6 percent sulfonate of Example 1. Latex D was of terpolymer of 48 weight percent styrene, 50 weight percent butadiene and 2 weight percent itaconic acid and used less than 0.7 percent sulfonate of Example 1.

Some of the mats were air dried prior to the rain test and observed after redrying. Other mats were dried for 1 day under ultraviolet light (equivalent to 2 to 3 days exposure to direct sunlight) and redried after the rain test.

The results are shown in Table II.

TABLE II

| Latex | % cellulose ether | Mat Strength Retention | |
|---|---|---|---|
| | | Air Dry | UV Cured |
| A | 0 | Slight | Very slight |
| A | 0.5 | Very high | Very high |
| A | 1.0 | Very high | Very high |
| B | 0 | Poor | Slight |
| B | 0.5 | Slight | Slight |
| B | 1.0 | Poor | Slight |
| C | 0 | Poor | — |
| C | 0.5 | Slight | — |
| C | 1.0 | Poor | — |
| D | 0 | Slight | Slight |
| D | 0.5 | Very high | Slight |
| D | 1.0 | Very high | Slight |

EXAMPLE 3

A latex of a polymer of 48 percent styrene, 50 percent butadiene and 2 percent itaconic acid was formulated with 0.75 percent of the sulfonate and varying amounts of from 0.5 to 2.5 percent of the cellulose ether of Example 1. In each case, the straw mats prepared therewith according to that example exhibited very high mat strength retention both air dry and UV cured. When 5 percent sulfonate was used the water resistance was effectively destroyed.

When the latex was formulated with no cellulose ether and with varying amounts of sulfonate of up to 5 percent the results were somewhat erratic but in no instance was considered acceptable.

When the latex was formulated with no sulfonate and with the cellulose ether the wind and water resistance was unsatisfactory.

EXAMPLE 4

Other latexes falling outside this invention were used to prepare straw mats as in Example 1 and tested according to Examples 1 and 2.

Latex E was of an interpolymer of 61 weight percent styrene, 36.5 weight percent butadiene, 2 weight percent acrylic acid and 0.5 weight percent itaconic acid.

Latex F was of a terpolymer of 58 weight percent styrene, 38 weight percent butadiene, and 4 weight percent acrylic acid.

The results are shown in Table III.

TABLE III

| Latex | % cellulose ether | % mat wt. loss | Conditions (mph) | Mat strength retention after rain exposure |
|---|---|---|---|---|
| E | 0 | 56.0 | 44 | failed |
| | 0.5 | 3.0 | 48 | do. |
| F | 0 | 50.0 | 48 | do. |
| | 0.5 | 4.0 | 48 | do. |

What is claimed is:

1. A coherent air and moisture permeable straw mat for covering soil to prevent wind and rain erosion thereof, said mat comprising straw stalks distributed randomly into a layer with the stalks adhered together at their points of contact with each other with at least 75 pounds per ton of straw of a water resistant adhesive consisting essentially of (1) an interpolymer of less than 60 weight percent of an alkenyl aromatic monomer, wherein an alkenyl group is attached directly to an aromatic nucleus, at least 40 weight percent of an open chain conjugated diolefin having from 4 to about 9 carbon atoms, and an unsaturated carboxylic acid or anhydride, (2) from about 0.5 to 2.5 weight percent based on polymer solids of a water soluble cellulose ether and (3) from about 0.7 to 2.5 weight percent of a water-soluble organo sulfonate having at least one sulfonate group attached to an aromatic ring and represented by the formula:

$$R-[Ar\ SO_3]\ M$$

wherein R is an alkyl chain having from about 8 to 20 carbon atoms and combinations of said chains with ethoxy chains, phenyl, phenoxy and alkyl or alkoxy substituted phenyl or phenoxy: Ar is phenyl or naphthyl and M is an alkali metal or ammonia.

2. The straw mat of claim 1 wherein said interpolymer is composed of styrene, butadiene, acrylic acid and maleic anhydride.

3. The straw mat of claim 2 wherein said interpolymer is composed of about 36.5 weight percent styrene, about 60 weight percent butadiene, about 2 weight percent acrylic acid and about 1.5 weight percent maleic anhydride.

4. The straw mat of claim 1 wherein said interpolymer is composed of styrene, butadiene and itaconic acid.

5. The straw mat of claim 1 wherein said interpolymer is composed of about 48 weight percent styrene, about 50 weight percent butadiene and about 2 weight percent itaconic acid.

6. The straw mat of claim 1 wherein said water soluble cellulose ether is hydroxypropyl methyl cellulose.

7. The straw mat of claim 1 wherein said organo sulfonate is sodium dodecylphenoxy benzene sulfonate.

8. A method for making a wind and rain resistant straw mat comprising the blending of straw with at least 75 pounds per ton of straw of a water resistant adhesive, consisting essentially of (1) an interpolymer of less than 60 weight percent of an alkenyl aromatic monomer wherein an alkenyl group is attached directly to an aromatic nucleus, at least 40 weight percent of an open chain conjugated diolefin having from 4 to about 9 carbon atoms, and an unsaturated carboxylic acid or anhydride (2) from about 0.5 to 2.5 weight percent based on polymer solids of a water soluble cellulose ether and (3) from about 0.70 to 2.5 weight percent of a water-soluble organo sulfonate having at least one sulfonate group attached to an aromatic ring and represented by the formula:

$$R [Ar - SO_3] M$$

wherein R is an alkyl chain having from about 8 to 20 carbon atoms, an alkenyl chain having from about 8 to 20 carbon atoms and combinations of said chains with ethoxy chains, phenyl, phenoxy, and alkyl or alkoxy substituted phenyl or phenoxy:

Ar is phenyl or naphthyl and M is an alkali metal or ammonia, distributing the coated straw randomly into a layer, and drying the adhesive.

* * * * *